United States Patent
Chern et al.

(10) Patent No.: US 7,403,683 B2
(45) Date of Patent: Jul. 22, 2008

(54) SUPER-RESOLUTION OPTICAL COMPONENTS AND LEFT-HANDED MATERIALS THEREOF

(75) Inventors: Jyh-Long Chern, Hsinchu (TW); Yi-Jang Hsu, Hsinchu (TW); Pong Lai, Taipei County (TW); Chang-Sheng Chu, Hsinchu (TW); Rung-Ywan Tsai, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 58 days.

(21) Appl. No.: 11/165,123

(22) Filed: Jun. 24, 2005

(65) Prior Publication Data

US 2006/0145787 A1 Jul. 6, 2006

(30) Foreign Application Priority Data

Dec. 31, 2004 (TW) .............................. 93141729 A

(51) Int. Cl.
  *G02B 6/26* (2006.01)
  *G02B 6/42* (2006.01)
  *G02B 6/10* (2006.01)
(52) U.S. Cl. .................... 385/39; 385/131; 333/195; 333/219; 310/313 R; 359/346

(58) Field of Classification Search ............... 385/14, 385/27, 39, 131; 333/195, 219; 310/313 R; 359/346

See application file for complete search history.

(56) References Cited

U.S. PATENT DOCUMENTS

| | | | |
|---|---|---|---|
| 6,791,432 B2 * | 9/2004 | Smith et al. ................. 333/99 S |
| 7,061,220 B1 * | 6/2006 | Nalbandian et al. ....... 324/76.19 |
| 7,205,941 B2 * | 4/2007 | Wang et al. ........... 343/700 MS |
| 7,256,753 B2 * | 8/2007 | Werner et al. ............... 343/909 |
| 2004/0066251 A1 * | 4/2004 | Eleftheriades et al. ...... 333/117 |
| 2006/0152430 A1 * | 7/2006 | Seddon et al. .............. 343/909 |
| 2007/0024399 A1 * | 2/2007 | Antolin et al. .............. 333/205 |

* cited by examiner

*Primary Examiner*—Sung Pak
*Assistant Examiner*—Daniel Petkovsek
(74) *Attorney, Agent, or Firm*—Birch, Stewart, Kolasch & Birch, LLP

(57) ABSTRACT

Super-resolution optical components and left-handed materials thereof are provided. A left-handed material includes a substrate, a plurality of deformed split ring resonators (DSRR), and a plurality of metallic bars, wherein the DSRR and the metallic bars are disposed on the substrate with each DSRR and metal bar alternately arranged.

13 Claims, 12 Drawing Sheets
(3 of 12 Drawing Sheet(s) Filed in Color)

US 7,403,683 B2

SUPER-RESOLUTION OPTICAL COMPONENTS AND LEFT-HANDED MATERIALS THEREOF

BACKGROUND OF THE INVENTION

1. Field of the Invention

The invention relates to left-handed materials, and in particular to left-handed materials with deformed split ring resonators (DSRR) conducted to provide negative permeability.

2. Brief Discussion of the Related Art

With reference to the discussion of negative permeability material or left-handed metallic structure, in 1968, Veselago disclosed a theory that when transmitted through a substance with negative dielectric coefficient and negative permeability, an electromagnetic wave will display a distinctive and unusual quality. Moreover, in 1996, Pendry disclosed a system combining the split-ring resonator array with a metallic line array to enable an electromagnetic wave of a certain microwave band to simultaneously possess a negative dielectric coefficient and negative permeability. In 2000, Pendry also applied this theory to the analysis of optical lens resolution. Thus, if a metallic structure with left-handed materials can be developed, the metallic structure will be capable of altering the non-penetrability of ordinary substances and modulating the wave-transmitting direction. Additionally, if formed on a large-scale silica substrate or other transparent substrate, the left-handed material can be introduced to produce a planar super-resolution optical lens. Accordingly, the requirements of delicate mechanical tolerance can be reduced, thus increasing assembly efficiency and production yield.

SUMMARY OF THE INVENTION

Super-resolution optical components and left-handed materials thereof are provided. A left-handed material includes a substrate, a plurality of deformed split ring resonators (DSRR), and a plurality of metallic bars, wherein the DSRR and the metallic bars are disposed on the substrate with each DSRR and metal bar alternately arranged.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE DRAWINGS

The patent or application file contains at least one drawing executed in color. Copies of this patent or patent application publication with color drawing(s) will be provided by the office upon request and payment of the necessary fee.

The present application will become more fully understood from the subsequent detailed description and the accompanying drawings, which are given by way of illustration only and thus are not limitative of the present application, and wherein.

DETAILED DESCRIPTION OF THE PREFERRED EMBODIMENTS

Figure 1:
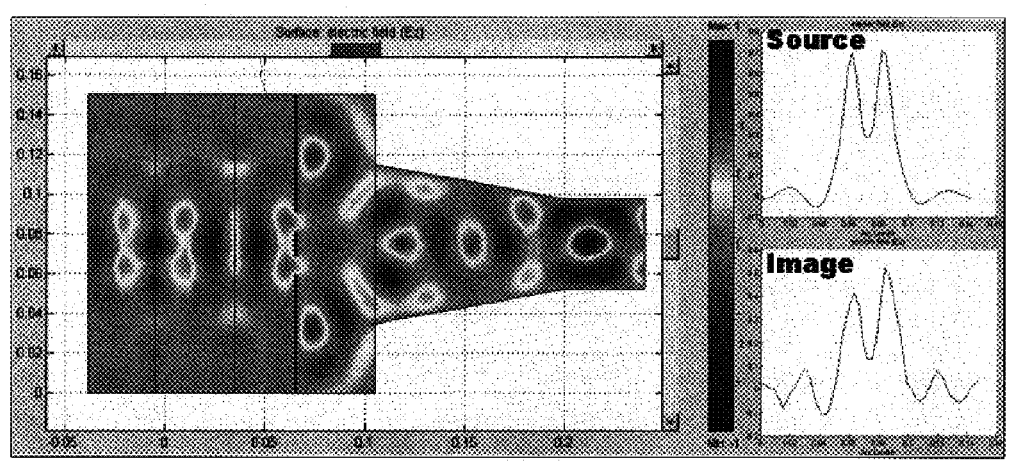
FIG. 1 is a diagram of microwave simulation of left-handed materials of the invention.

Please refer to FIG. 1. FIG. 1 is a diagram of microwave simulation of left-handed materials of the invention. When the refraction index is negative and the simulation microwave waveband is 10.8 GHz, the input waveband first passes through two slits and forms an intensity distribution. Then, as shown in FIG. 1, after passing through the negative permeability material, the intensity distribution can return to the original condition without dispersion.

Figure 2:
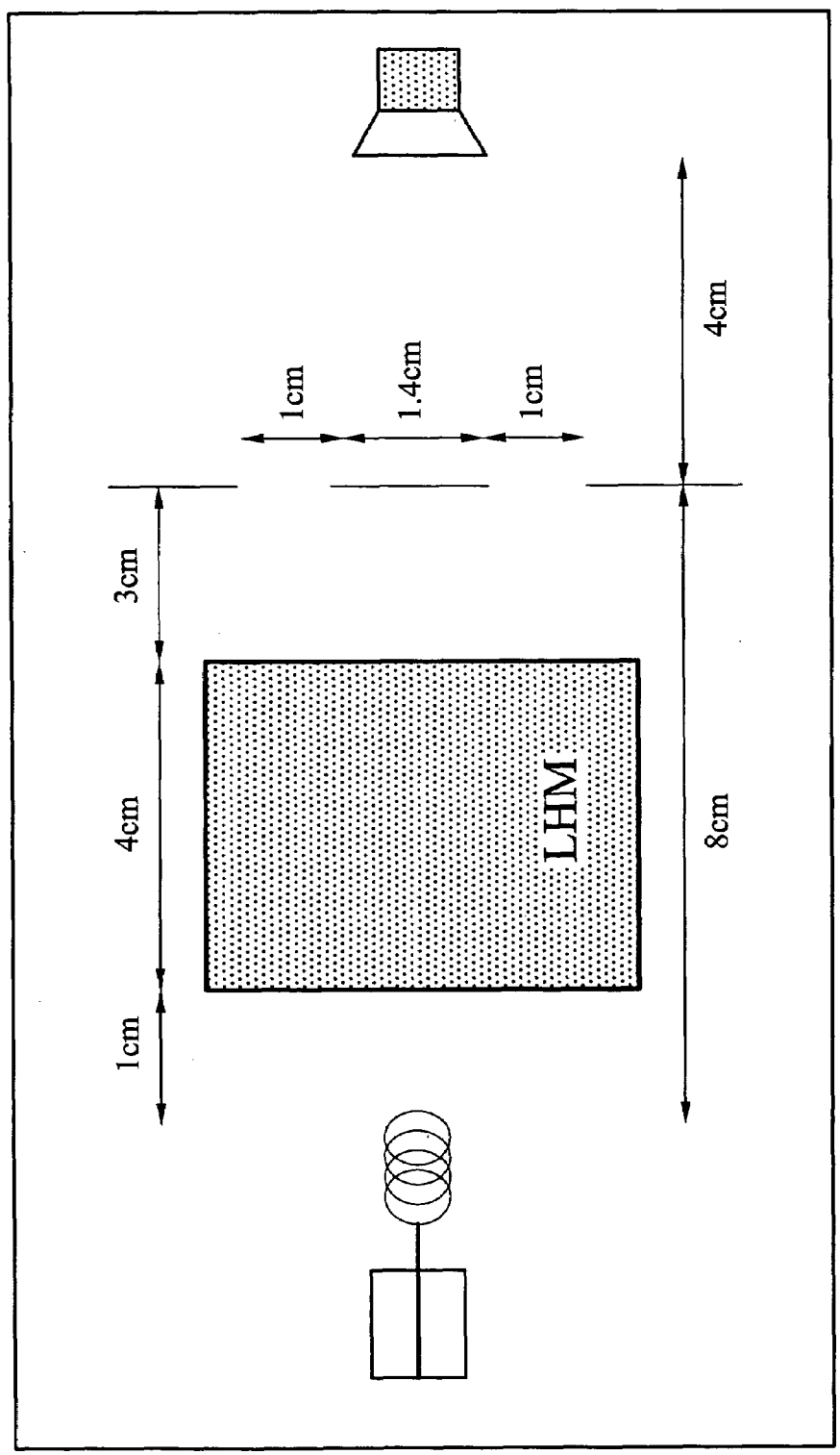
FIG. 2 shows a microwave experiment frame conducted to verify the simulation result of FIG. 1.
Figure 3:
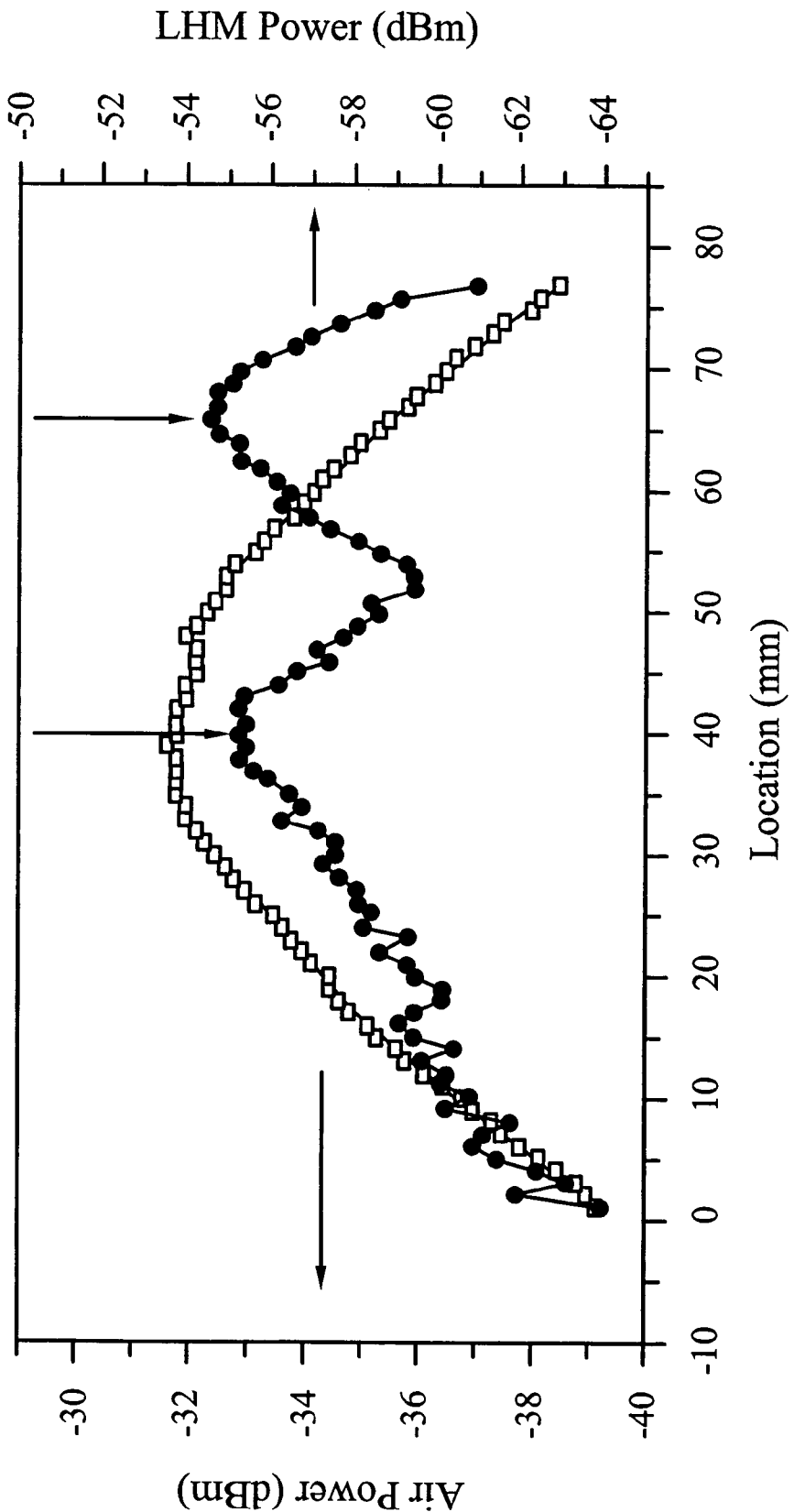
FIG. 3 shows the result of the experiment utilizing the microwave experiment frame of FIG. 2.

FIG. 2 shows a design of a verified experiment frame using microwave waveband 10.8 GHZ as the input source. Further, when the input waveband passes through two slits disposed at a specified distance and the left-handed material, as shown in FIG. 3, two peaks can be analyzed via the left-handed material of the invention. Thus, it is verified that the resolution of microwave waveband is smaller than the wavelength of the microwave.

In fact, the inventive negative permeability structure may be applied to produce super-resolution optical focusing lenses such that the light wave may be focused to the extent that the resolution of light wave is smaller than the wavelength of the light wave.

Figure 4A:
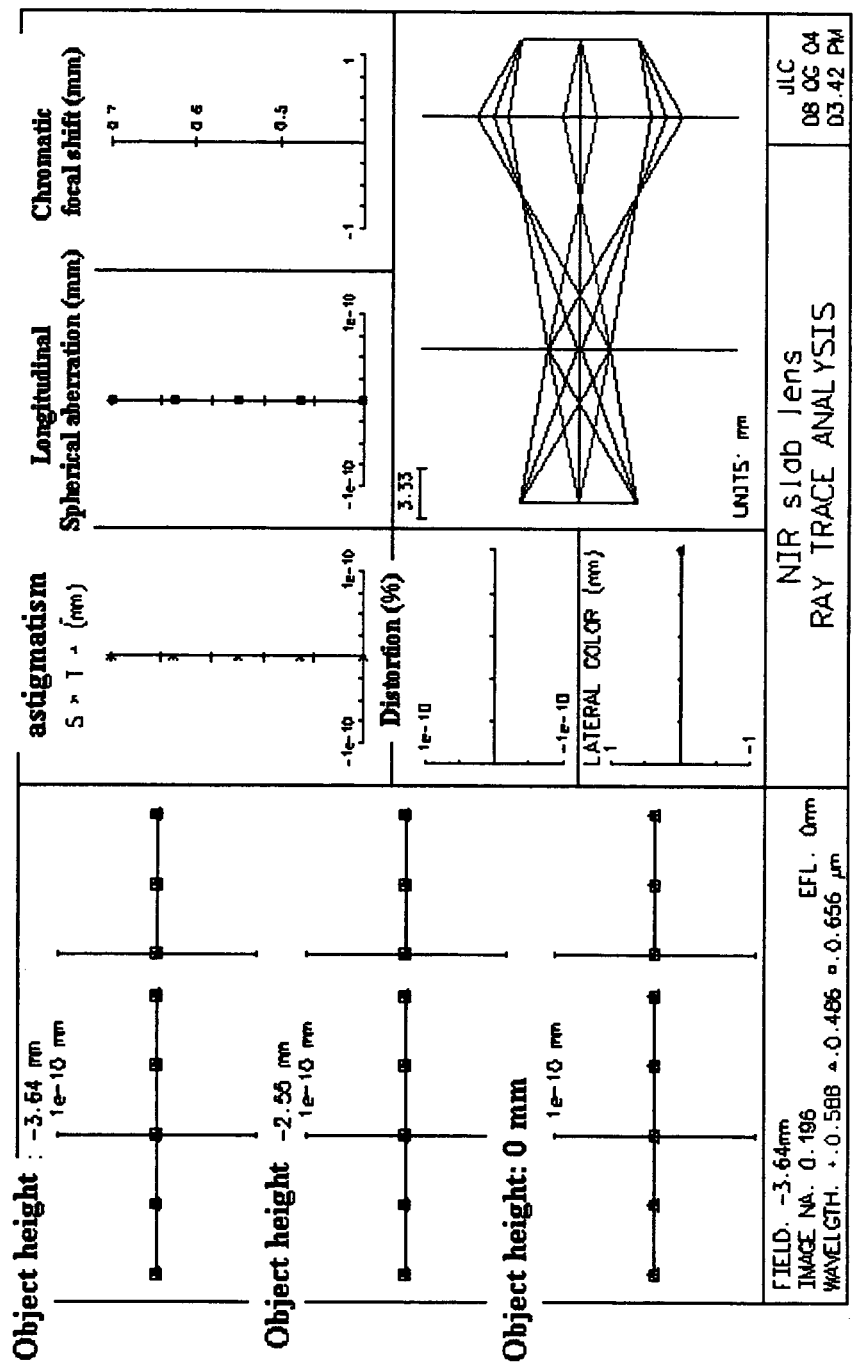
FIG. 4a shows the aberration analysis result of left-handed materials within the visible light
Figure 4B:
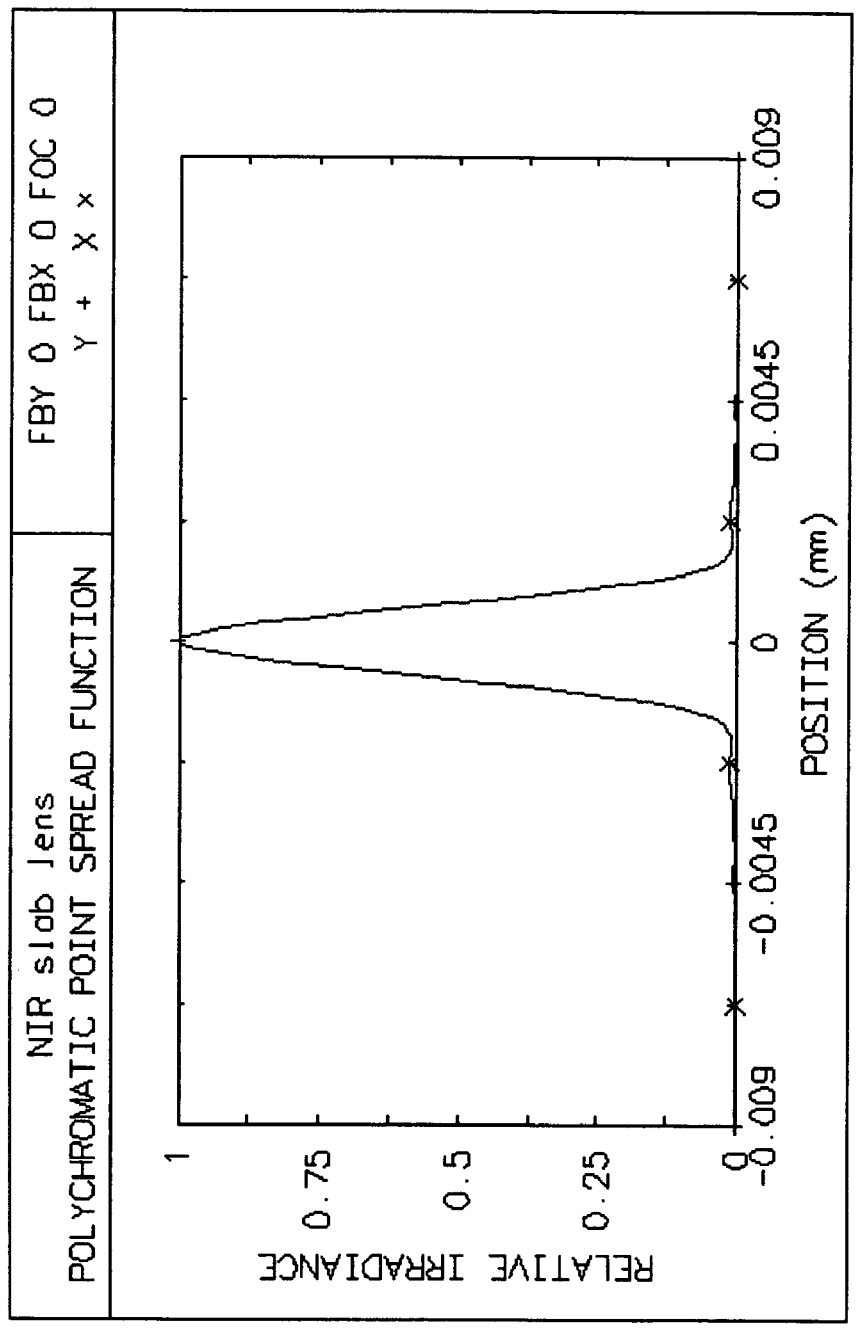
FIG. 4b shows the aberration analysis result of left-handed materials within the visible light.
Figure 4C:
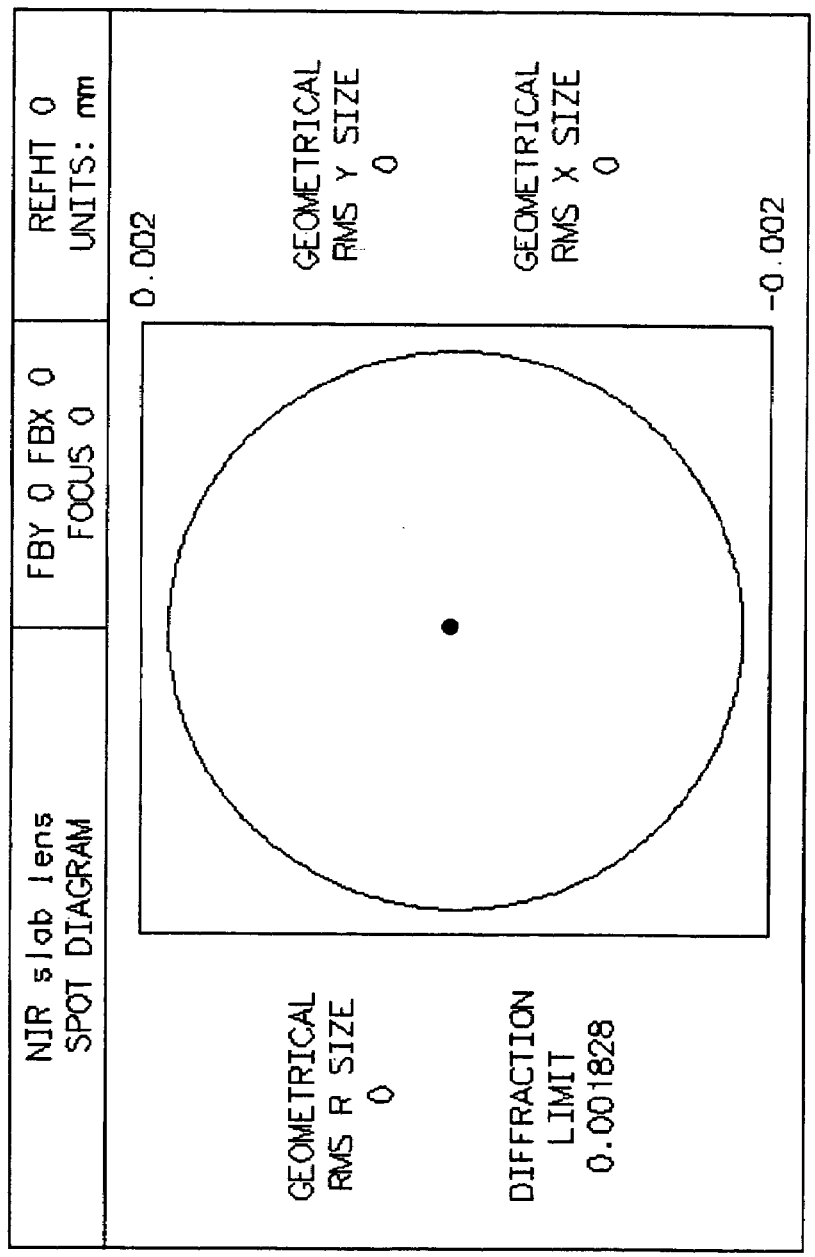
FIG. 4c is s light spot diagram of left-handed materials within the visible light.

Please refer to FIG. 4a. FIG. 4a shows the aberration analysis result of the corresponding focal plane. As shown in FIG. 4a, even though the equivalent field of view is 20 degrees (the total field of view is 40 degrees), all kinds of aberrations are zero. Referring next to FIGS. 4b & 4c, FIG. 4c shows the spot-sized diagram of left-handed materials within the visible light. As shown in FIG. 4c, the spot size is much smaller than the Airy disc corresponding to the diffraction limit.

Figure 5:
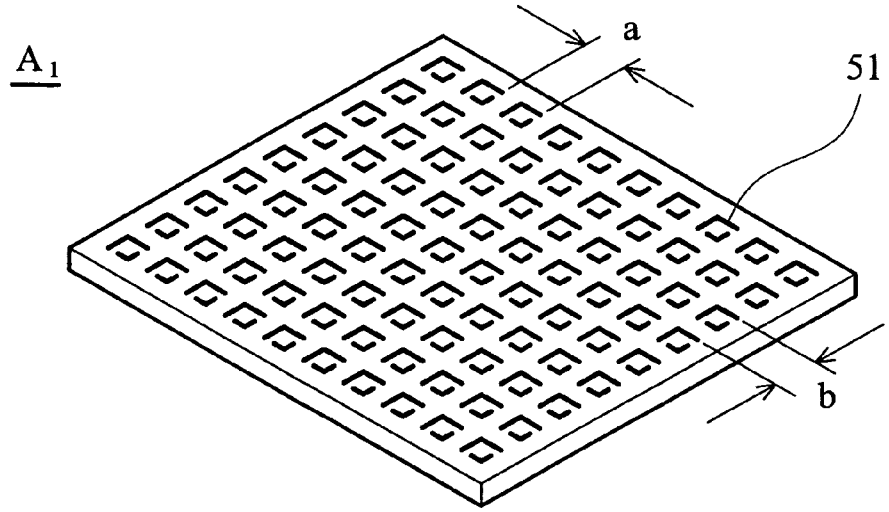
FIG. 5 is a diagram of the deformed split ring resonators having negative permeability.

Further, please refer next to FIG. 5. FIG. 5 is a diagram of deformed split ring resonators having negative permeability of the invention, wherein the negative permeability metallic structure $A_1$ comprises a plurality of deformed split ring resonators 51. Moreover, each deformed split ring resonator 51 comprises two L-shaped metallic structures and is arranged in such a manner "⊏".

Additionally, the deformed split ring resonators 51 may be periodic or non-periodic and the suitable input wavelength is not limited to the visible light because the input wavelength is related to the period and the line width of the metallic pattern of the deformed split ring resonator 51. When the deformed split ring resonators 51 are periodic, as shown in FIG. 5, the length of period a and period b may be smaller than the input wavelength. When the deformed split ring resonators 51 are non-periodic, either the physical size of a structure unit or the line width of the metallic pattern may be smaller than the input wavelength. For example, with respect to the 1550 nm input wavelength, the physical size of a structural unit may be about 800 nm and the line width of the metallic pattern may be about 200 nm. Further, the thickness of the metallic structure is usually 200-500 nm, but not limited thereto. Additionally, the deformed split ring resonators 51 may be made of any metal element in the periodic table, transparent electric conduction materials, or other electric conduction materials substituted for metal.

Figure 6:
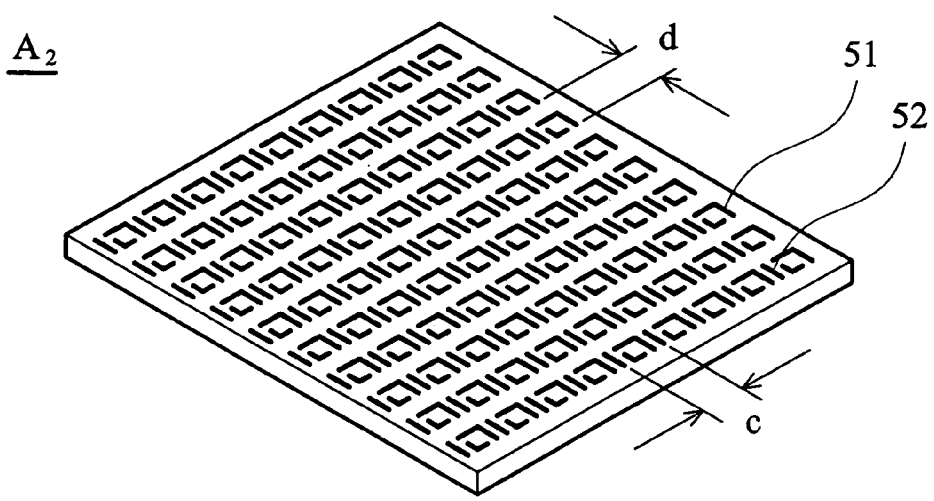
FIG. 6 is a diagram of the deformed split ring resonators combined with the split metallic bars on the same substrate.
Figure 7:
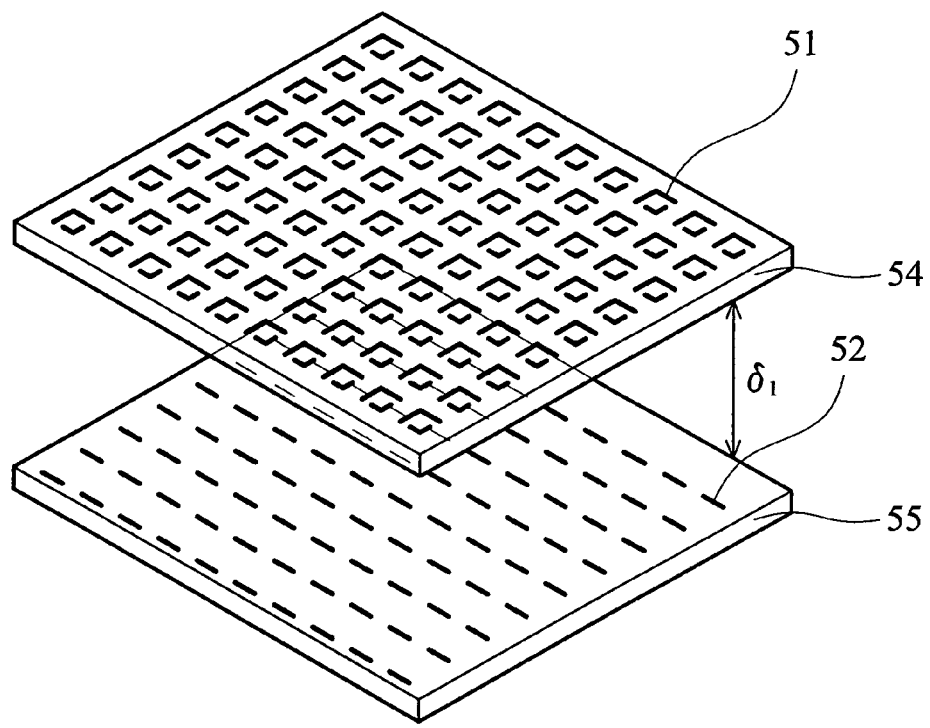
FIG. 7 is a diagram of the deformed split ring resonators combined with the split metallic bars disposed on the different substrate.
Figure 8:
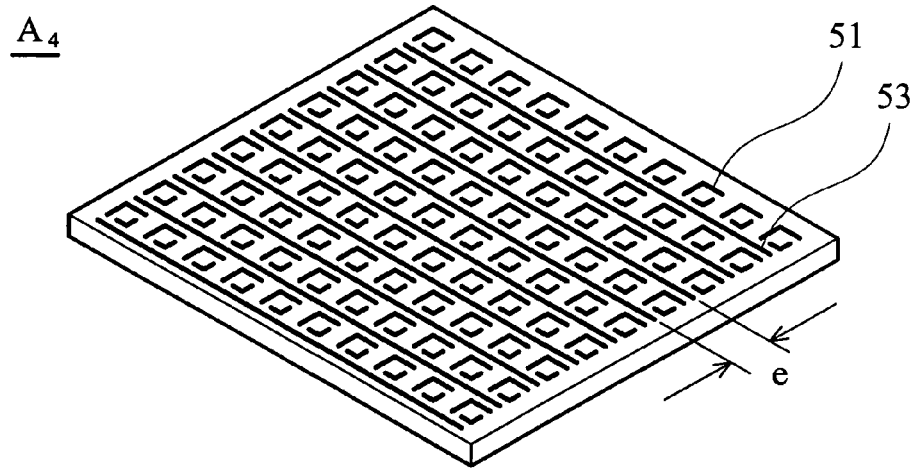
FIG. 8 is a diagram of the deformed split ring resonators combined with the long metallic bars on the same substrate.
Figure 9:
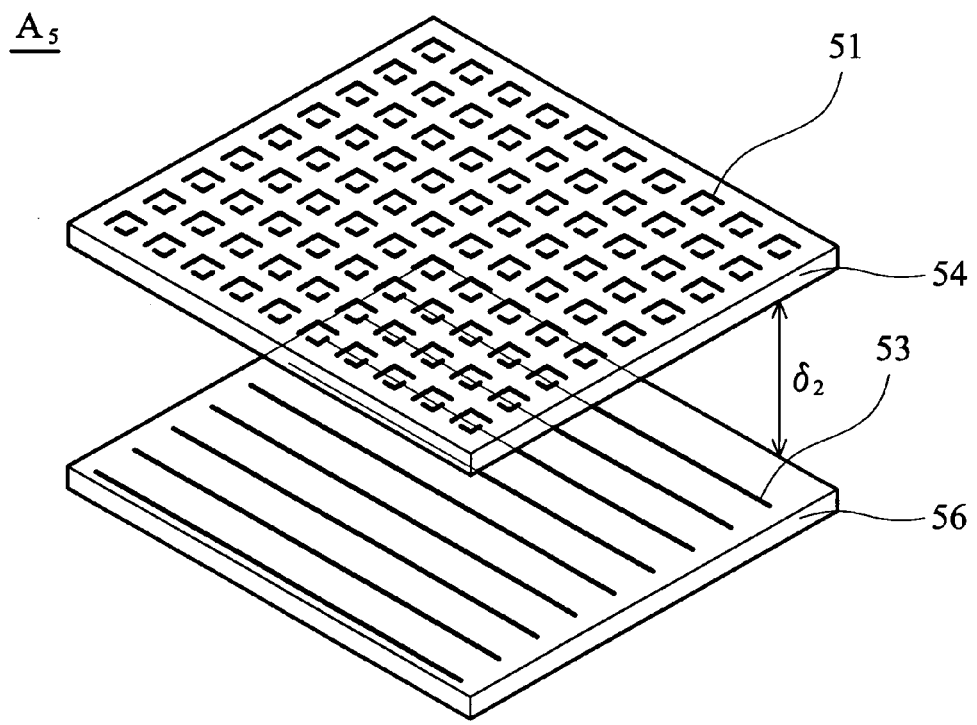
FIG. 9 is a diagram of the deformed split ring resonators combined with the long metallic bars disposed on the different substrate.

Please refer to FIGS. 6-9, the deformed split ring resonators 51 may be combined with the split metallic bars 52 (as shown in FIG. 6) or the long metallic bars 53 (as shown in FIG. 8) to form a left-handed material, wherein the above-mentioned metallic structures are formed on a silica substrate or other transparent substrates. As shown in FIG. 6, the deformed split ring resonators 51 are combined with the split metallic bars 52 on the same substrate to form a left-handed material $A_2$, wherein the left-handed material $A_2$ may be formed on a silica substrate or other transparent substrate. Symbol c and symbol d respectively represent different periods of the split metallic bars 52. FIG. 7 is a diagram of the deformed split ring resonators 51 combined with the split metallic bars 52 disposed on a different substrate to form a left-handed material $A_3$, wherein $\delta_1$ represents a distance between the deformed split ring resonator layer 54 and the split metallic bar layer 55 and the distance is usually smaller than input wavelength. Additionally, FIG. 8 is the deformed split ring resonators 51 combined with the long metallic bars 53 on the same substrate to form a left-handed material $A_4$, wherein the left-handed material $A_4$ may be formed on a silica substrate or other transparent substrate. Symbol e represents the period of the long metallic bars 53. FIG. 9 is a diagram of the deformed split ring resonators 51 combined with the long metallic bars 53 disposed on a different substrate to form a left-handed material $A_5$ wherein $\delta_2$ represents a distance between the deformed split ring resonator layer 54 and the long metallic bar layer 56 and the distance is usually smaller than the input wavelength.

Figure 10:
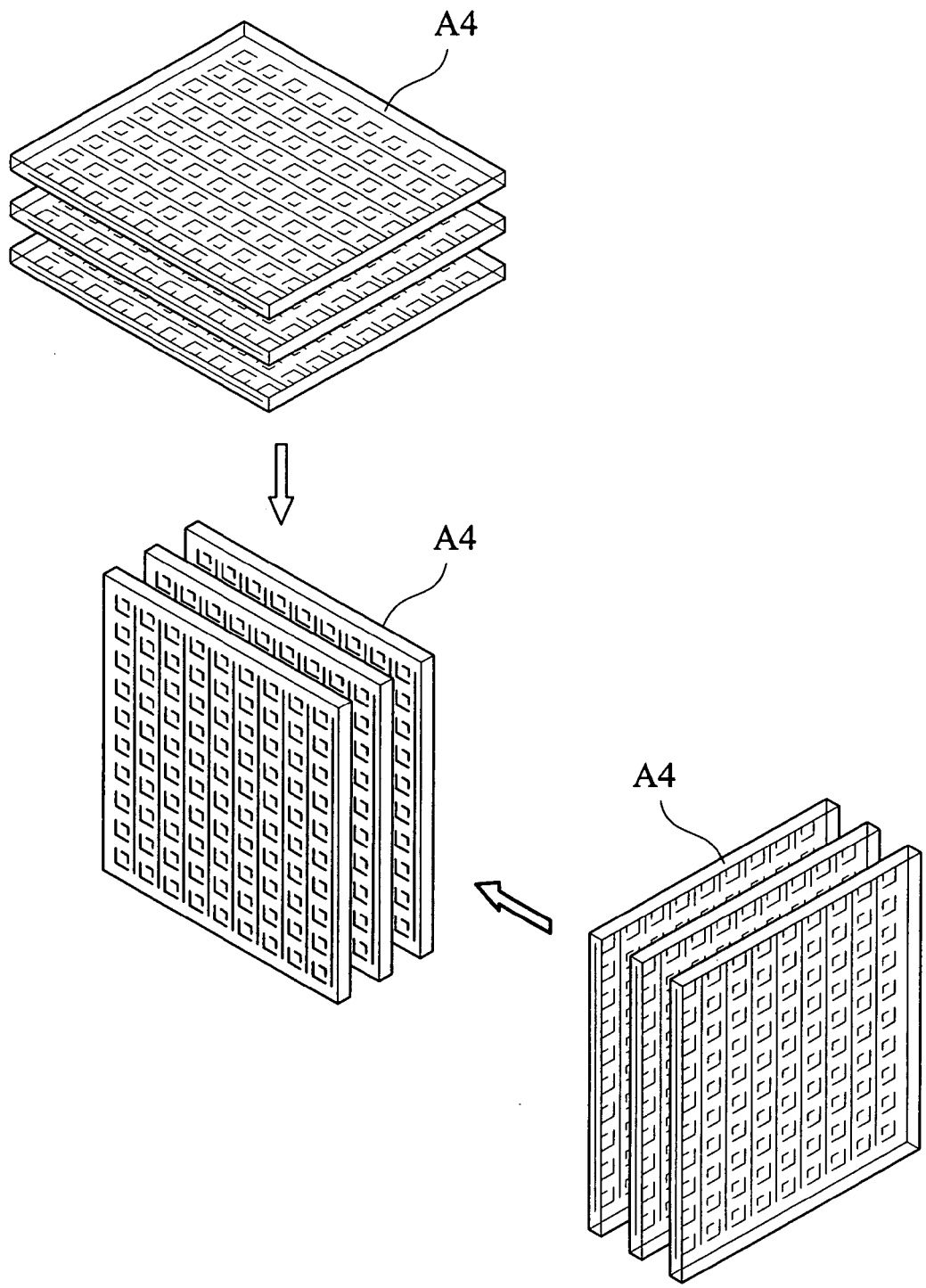
FIG. 10 is a diagram of the planar optical focusing lens utilizing the left-handed material of the invention.

The left-handed material of the invention may be implemented in other aspects. In a preferable embodiment, as shown in FIG. 10, by arranging a cube of parallelly disposed left-handed materials $A_4$ on the large silica substrate or other transparent substrates, a super-resolution optical component or a super-resolution optical focusing lens is formed. It is emphasized, however, that the left-handed material of the invention may also be applied to any other shape.

Figure 11:
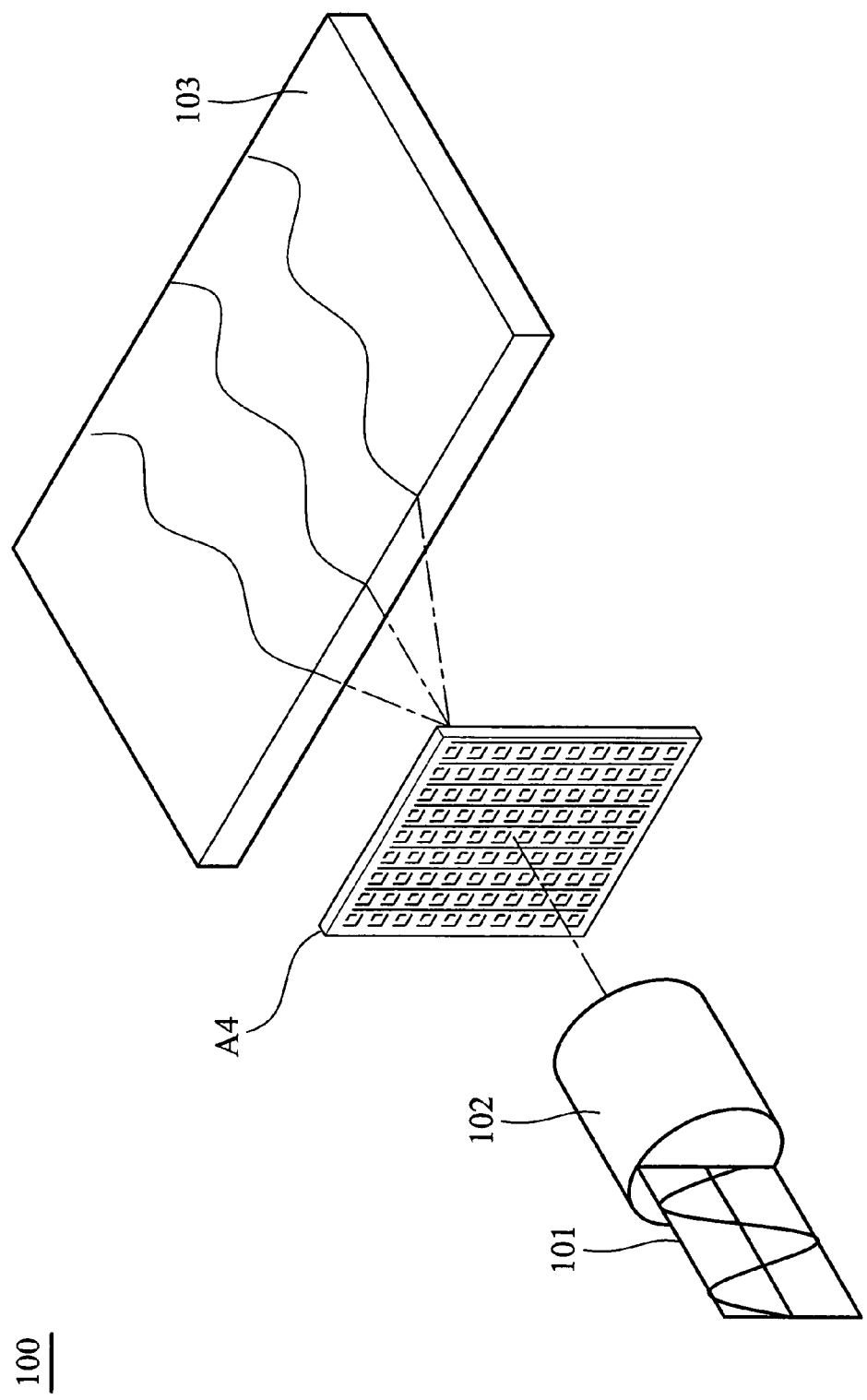
FIG. 11 is a diagram of the waveguide component utilizing the left-handed material of the invention.

Moreover, the left-handed material of the invention may be introduced to a waveguide component 100. As shown in FIG. 11, a waveguide component comprises a light source 101, a light-coupling device 102, a left-handed material $A_4$, and a dispersion waveguide component 103, wherein the light source 101 may be a multi-wavelength laser conducted to emit light and the light-coupling device 102 may be a fiber conducted to transmit the light from the light source 101. Additionally, the left-handed material $A_4$ is conducted to disperse the light processed by the light-coupling device 102 and then the dispersion waveguide component 103 is conducted to receive the light dispersed by the left-handed material $A_4$. Under the trend of photon crystal integration, the left-handed material may also be used as a mode converter between a fiber and a photon crystal device.

Figure 12:
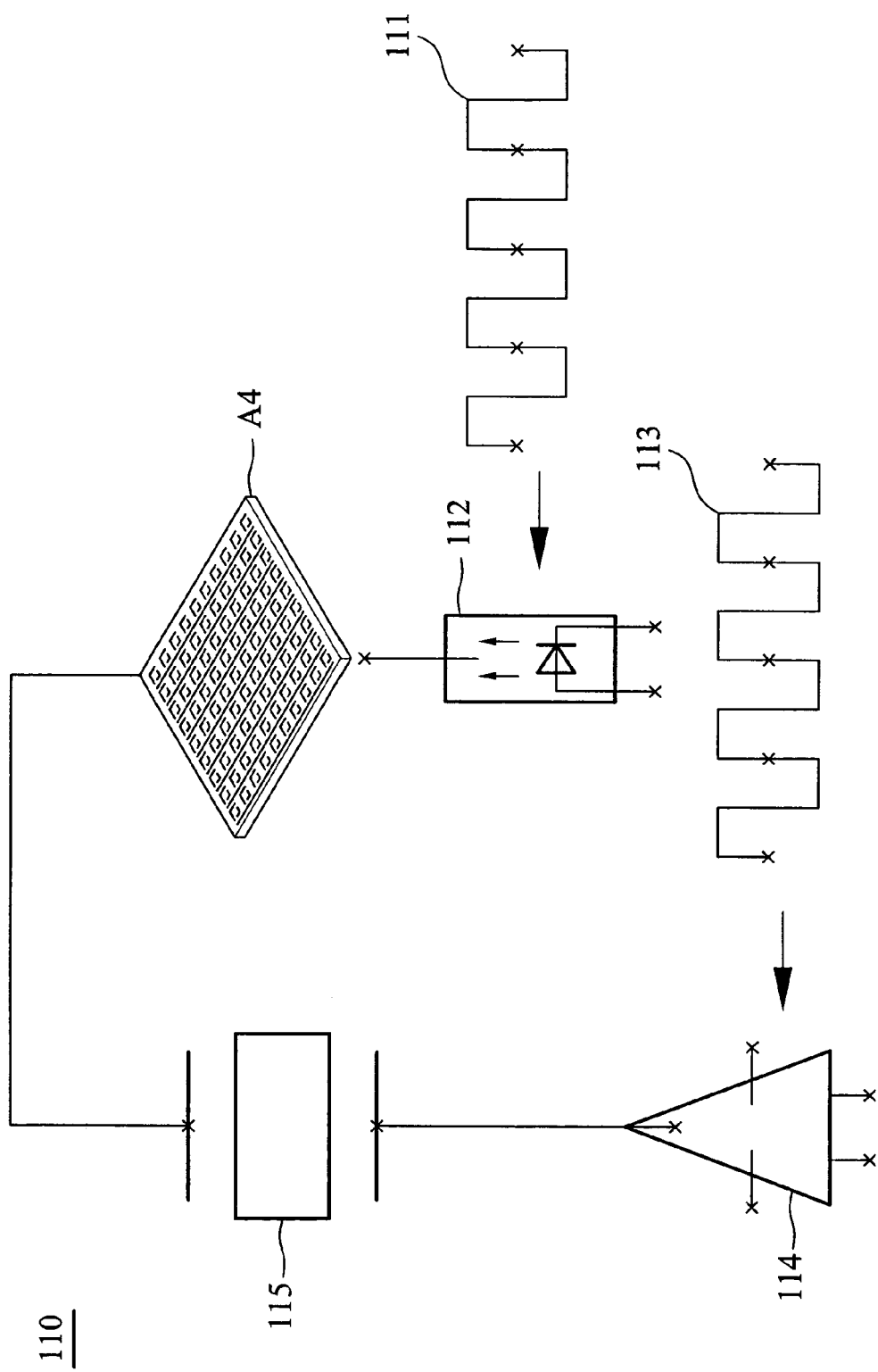
FIG. 12 is a diagram of the left-handed material with external circuits or external optical controllers.

Another application of the left-handed material is coordination with external circuits or external optical controllers. Further, this device may form a waveguide component 110 capable of adjusting the index of refraction and the focusing efficiency. As shown in FIG. 12, a programmable waveguide component 110 comprises a light source 112, a first modulation signal 111, a second modulation signal 113, an amplifier 114, a resistance variable device 115, and a left-handed material $A_4$, wherein the light source 112 may be light emitting diode (LED) or laser and the first modulation signal 111 is conducted to control the light source 112. Moreover, the amplifier 114 is conducted to amplify the second modulation signal 113 and the resistance variable device 115 is electrically connected with the amplifier 114 to receive the control signal and further control the material features of the left-handed material $A_4$. The left-handed material $A_4$ is electrically connected with the resistance variable device 115 to modulate the light emitted from the light source 112.

As previously described, the invention provides deformed split ring resonators having negative permeability. By combining the deformed split ring resonators with the metallic bars, a left-handed material can be formed. The left-handed material can be utilized to produce a super-resolution optical focusing lens or a programmable super-resolution waveguide component.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A left-handed material, comprising:
   a substrate;
   a plurality of deformed split ring resonators disposed on the substrate; and
   a plurality of metallic bars directly disposed on the substrate, wherein each of the plurality of deformed split ring resonators and each of the plurality of metallic bars is alternately arranged.

2. The left-handed material as claimed in claim 1, wherein each of the plurality of deformed split ring resonators comprises two L-shaped metallic structures.

3. The left-handed material as claimed in claim 2, wherein each of the plurality of deformed split ring resonators is substantially in the shape of a L, with a smaller, inverted and backwards L diagonally across therefrom.

4. The left-handed material as claimed in claim 1, wherein the plurality of metallic bars are split metallic bars or long metallic bars.

5. The left-handed material as claimed in claim 1, wherein the plurality of deformed split ring resonators have metal or transparent electric conduction materials.

6. A super-resolution optical component, comprising:
   a plurality of left-handed materials, each having:
   a substrate;
   a plurality of deformed split ring resonators disposed on the substrate; and a plurality of metallic bars directly disposed on the substrate, wherein each of the plurality of deformed split ring resonators and each of the plurality of metallic bars is alternately arranged.

7. The super-resolution optical component as claimed in claim 6, wherein the plurality of metallic bars are split metallic bars or long metallic bars.

8. The super-resolution optical component as claimed in claim 6, wherein the substrate is a silica substrate or other transparent substrate.

9. A left-handed material, comprising:
a first substrate;
a second substrate disposed parallel to and at a distance from the first substrate;
a plurality of deformed split ring resonators disposed on one of the first or second substrate; and
a plurality of metallic bars directly disposed on the second substrate, wherein each of the plurality of deformed split ring resonators and each of the plurality of metallic bars are corresponding and alternately arranged.

10. The left-handed material as claimed in claim 9, wherein each of the plurality of deformed split ring resonators has two L-shaped metallic structures.

11. The left-handed material as claimed in claim 10, wherein each of the plurality of deformed split ring resonators is substantially in the shape of a L, with a smaller, inverted and backwards L diagonally across therefrom.

12. The left-handed material as claimed in claim 9, wherein the plurality of metallic bars are split metallic bars or long metallic bars.

13. The left-handed material as claimed in claim 9, wherein the plurality of deformed split ring resonators have metal or transparent electric conduction materials.

\* \* \* \* \*